United States Patent [19]

Winter

[11] Patent Number: 4,744,628
[45] Date of Patent: May 17, 1988

[54] COUPLING DEVICE FOR LIGHT TRANSMISSIVE MEDIA

[76] Inventor: Richard G. Winter, c/o XRE Corp., 300 Foster St., Littleton, Mass. 01460

[21] Appl. No.: 775,418

[22] Filed: Sep. 12, 1985

[51] Int. Cl.⁴ .............................................. G02B 6/36
[52] U.S. Cl. ............................. 350/96.20; 350/96.21; 350/96.22
[58] Field of Search ............... 350/96.20, 96.21, 96.22, 350/96.10, 96.29; 362/32

[56] References Cited

U.S. PATENT DOCUMENTS

| | | | |
|---|---|---|---|
| 4,140,365 | 2/1979 | Burger et al. | 350/96.2 |
| 4,196,032 | 4/1980 | Eggleston | 350/96.2 X |
| 4,240,695 | 12/1980 | Evans | 350/96.2 X |
| 4,444,516 | 4/1984 | Dostoomian et al. | 350/96.2 X |
| 4,490,007 | 12/1984 | Murata | 350/96.2 |
| 4,572,609 | 2/1986 | Sakuragi et al. | 350/96.3 |

Primary Examiner—John Lee
Assistant Examiner—Michael Menz
Attorney, Agent, or Firm—M. Lawrence Oliverio

[57] ABSTRACT

A joint for coupling light transmissive media mounted in separate housings, at complementary mating surfaces comprising: a pusher including springs attached to an array of spaced pusher arms engageable with a pusher surface connected to one of the light transmissive media; a barrier for engaging the rear of the pusher wherein the pusher exerts a predetermined amount of compression mating force between the mating surfaces of the light transmissive media; and a mechanism for aligning the mating surfaces of the light transmissive media comprising a pilot strap surrounding one of the light transmissive media, the strap including spaced fingers for receiving and aligning the other of the light transmissive media.

11 Claims, 2 Drawing Sheets

COUPLING DEVICE FOR LIGHT TRANSMISSIVE MEDIA

BACKGROUND OF THE INVENTION

The present invention relates to coupling mechanisms and specifically to a coupler for joining and aligning complementary shaped ends of a pair of light transmissive media.

The processing of light images emanating from an original light source such as a fluorescent screen or the like often requires routing the original image through an appropriate light transmissive medium to another image processing device such as an image intensifier, television camera, or the like which resides in a location remote from the point of original reception of the light image. The light transmissive medium used in routing the original image typically requires coupling at some point to a complementary light transmissive medium which itself is connected to or routes the image to its ultimate destination. The intermediate coupling of separate light transmissive media is complicated by the fact that (a) the separate media must be coupled in such a way as to minimize and/or eliminate optical voids at the point of coupling, (b) the coupling of the separate media must be resistant to uncoupling due to vibration, shock or haphazard movement or physical manipulation of the coupled media, and (c) the coupler must or should not interfere or otherwise electromagnetically interact with the routed image.

It is, therefore, an object of the invention to provide a joint for coupling separate light transmissive media which firmly joins the separate media, minimizes or eliminates the occurrence of optical voids between the mating surfaces of the separate media, and will not cause electromagnetic interference with a light image being transmitted through the media.

SUMMARY OF THE INVENTION

In accordance with the invention there is provided a joint for coupling light transmissive media mounted in separate housings, at complementary mating surfaces comprising: a pusher including springs attached to an array of spaced pusher arms engagable with a pusher surface connected to one of the light transmissive media; a barrier for engaging the rear of the pusher wherein the distance between the rear of the pusher and the point of engagement of the arms with the pusher surface is selected to exert a predetermined amount of compression force in the springs upon mating of the complementary mating surfaces and coupling of the housings; and, a mechanism for aligning the mating surfaces, comprising a pilot strap surrounding one of the light transmissive media, the pilot strap including spaced fingers for receiving and aligning the mating surface of the other of the light transmissive media with the mating surface of the one medium, the fingers protruding laterally from and parallel to the axis of the strap.

The pusher and the mechanism for aligning preferably comprises one or more non-conductive, non-magnetically interactive materials.

Most preferably the joint includes a mechanism for coupling the separate housings. The mechanism for coupling preferably comprises a yoke extending around one of the housings, an insulating jacket extending around the other of the housings, and a clamp extending around and engageable with the jacket through spaced detents extending inwardly from the clamp wherein the clamp and the yoke are attachable to each other. The jacket typically comprises one or more non-conductive, non-magnetically interactive materials, and, the spaces between the spaced pusher arms, the spaced fingers and the spaced detents are typically aligned upon coupling of the clamp and the yoke so as to allow air to flow without interruption through the pusher, past the alignment mechanism and through the clamp.

More preferably a thin layer of light transmissive oil resides between the complementary mating surfaces of the light transmissive media when coupled; and, the mating surfaces comprise polished optical fiber surfaces. The predetermined amount of force exerted between the mating surfaces via compression of the springs upon coupling of the housings is typically selected to be less than about one hundred pounds per square inch and most preferably between about 20 and about 40 pounds per square inch.

BRIEF DESCRIPTION OF THE DRAWINGS

Other objects, features, and advantages will be apparent from the following detailed description of preferred embodiments taken in conjunction with the accompanying drawings in which.

DETAILED DESCRIPTION OF PREFERRED EMBODIMENTS

Figure 1:
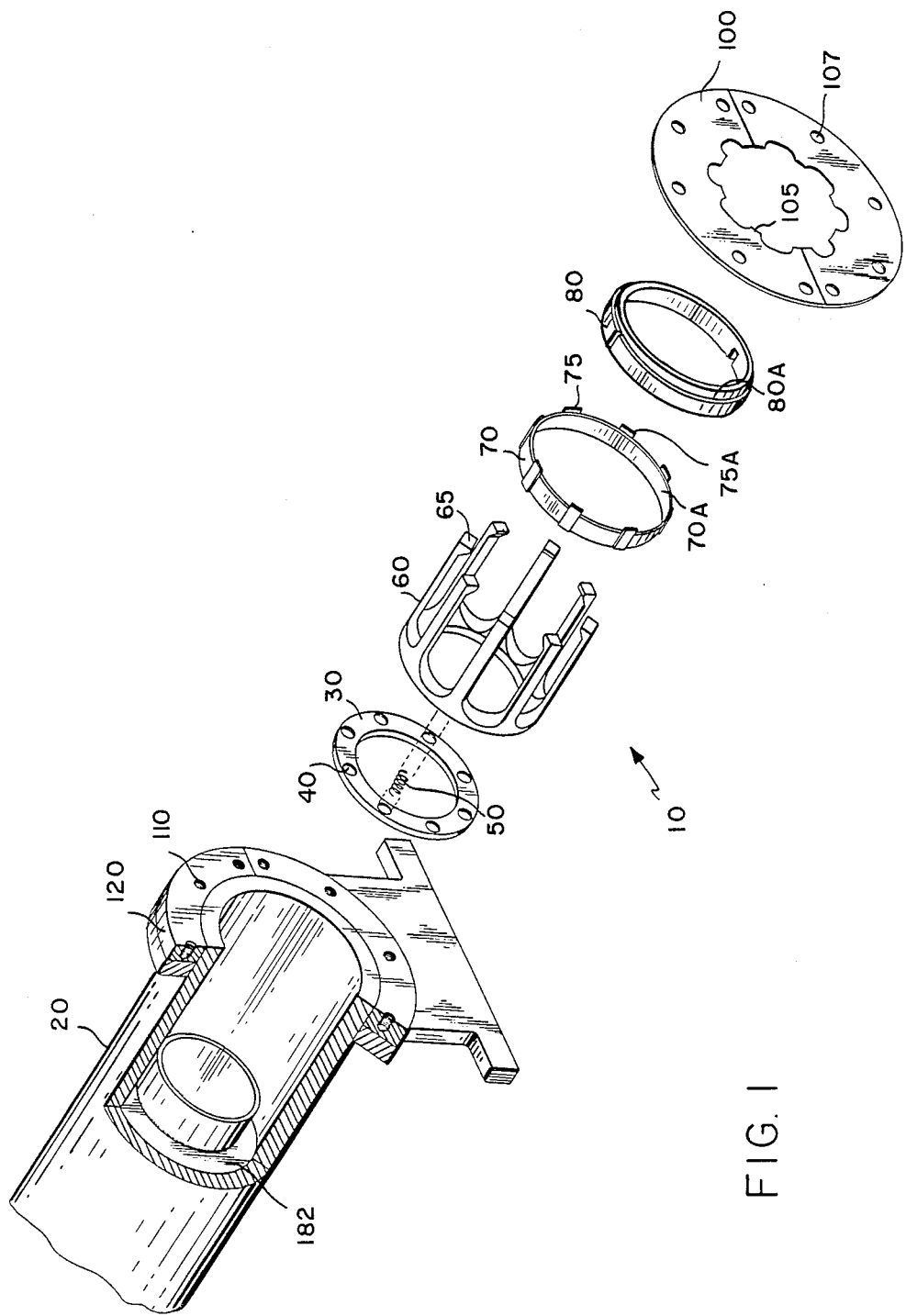
FIG. 1 shows an exploded view of a coupler joint according to the invention; and, FIG. 2 is a side partial cross-sectional view of a coupler joint connecting a pair of light transmissive media mounted within separate housings.

With reference to FIG. 1 a coupler 10 is shown exploded out from a housing 20 in which a light transmissive medium (not shown) is typically mounted.

The coupler 10 includes a rear face 30 which includes a series of receptacles 40 in which are mounted a series of pusher springs 50. The pusher springs 50, as shown by the dashed lines, FIG. 1, are aligned with and engage the rear of a series of pusher arms 60, the front ends 65 of which engage and push against a pusher surface 68, FIG. 2, which typically forms part of a protective housing 160 for the light transmissive medium 150. Coupler 10 includes a pilot strap 70 having a series of fingers 75 protruding laterally from and parallel to the axis of strap 70, FIG. 1.

Figure 2:
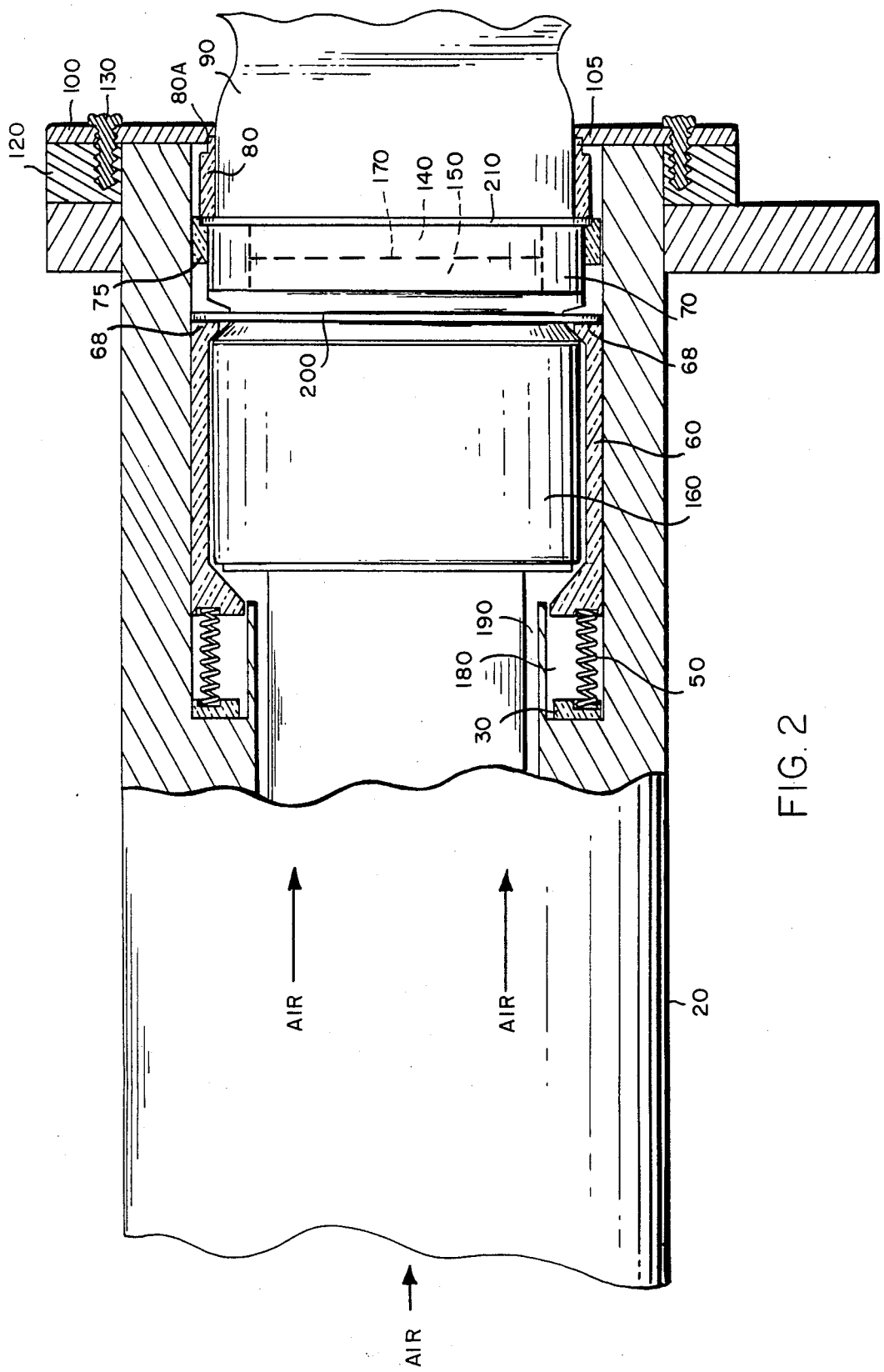

Coupler 10, FIG. 1, may include an insulating jacket 80 which wraps around the outside surface of a second protective housing 90, FIG. 2, which encases a second light transmissive medium 140 which mates with the first light transmissive medium 150 at mating surface 170, FIG. 2. A clamp 100 is provided for clamping housing 90 to housing 20. The clamp 100 is typically provided with inwardly projecting spaced teeth 105 for engaging a stepped surface 80A provided on jacket 80. Clamp 100 is typically provided with a series of apertures 107 which are alignable with a series of complementary threaded apertures 110 provided in a yoke section 120 of housing 20. Housings 90 and 20 are thus clamped together by connecting clamp 100 to yoke section 120 via conventional means such as by threaded bolts 130, FIG. 2, inserted through apertures 107 and 110, FIG. 1.

As shown in the alignment scheme in FIG. 1, the spaces between pusher arms 60, the spaces between fingers 75, and the spaces between teeth 105 are preferably aligned with each other prior to assembly of the coupler 10 within housing 20 and around the light transmissive media 140, 150 to be coupled.

As shown in FIG. 2, the light transmissive media 140, 150 are mounted in housings 90, 160 respectively and coupled together such that the separate media 140 and 150 mate together at their complementary mating surfaces 170 shown in cross section as being a straight flat surface in FIG. 2. The shape of the ends of the surfaces of media 140, 150 may take any form as long as the shapes of such ends are matable so as to provide a substantially continuous medium without air gaps or optical voids at the mating area. Most preferably a thin layer of optically transmissive oil is coated on and between the mating surface areas of the two media 140, 150 prior to their coupling together in order to further minimize the occurrence of air gaps therebetween.

Housing 20, FIGS. 1, 2 is provided with a well area 180, the back or bottom of which acts as a barrier surface 182 against which rear face 30 is seated. The interior of housing 20 is configured such that when housing 160 is mounted therein, an annular space 190 is left between housing 160 and the interior of housing 20 in order to allow cooling air to flow through the entire length of housing 20 and over the outside surface of housing 160. The thickness of spaced arms 60 is typically selected such that housing 160 may be seated relatively snugly within housing 20 and thereby prevent haphazard movement therein.

Air is typically flowed through housing 20 in the direction of the arrows shown in FIG. 2, in order to provide a continuous cooling of housing 160. As discussed more fully hereinafter a continuous air flow passage is provided between the rear of housing 20 and clamp 100 through which air may ultimately flow out of the system without interruption.

Housing 160 is typically provided with a flange like element 200, the rear face of which acts as a pusher surface 68 on which the ends 65 of arms 60 work to push housing 160 and light transmissive medium 150 forwardly into pressure contact with medium 140 under the compression force of resilient springs 50. The diameter of Flange 200 is typically selected so as not to abut the inside surface of the seating space provided in housing 20 thereby allowing air to flow therepast. If the diameter of flange-like element 200 is selected to fit snugly within the seating space provided within housing 20 (as shown in FIG. 2), then flange-like element 200 is provided with apertures (not shown) to allow air to flow therethrough.

As shown in FIGS. 1, 2 the inside surface 70A of pilot strap 70 wraps around the outside forward edge of light medium 150 and holds medium 150 ready to be mated and aligned with medium 140. A face plate coil (not shown) typically surrounds the end portion of medium 150 (or a portion of a housing surrounding the same) and the inside face 70A of strap 70 typically wraps around such face plate coil. Whatever additional housing or other components may surround the forward of medium 150, strap 70 preferably surrounds all such components such that fingers 75 may abut the inside surface of the seating space provided in housing 20. The inside surfaces 75A of spaced fingers 75 which are attached to the outside periphery of strap 70, overlap the outside surface of another flange-like element 210 which typically forms part of the forward edge of housing 90 which houses light medium 140. The complementary mating surfaces 170 of the two light transmissive media 140, 150 are thus aligned with each other by virtue of the combined pilot strap 70 and spaced finger 75 device. The outside diameter defined by the outside surfaces of spaced fingers 75 is typically selected to allow strap 70 and fingers 75 to seat relatively snugly within housing 20 and thereby prevent haphazard movement of housing 160 and housing 90 within housing 20.

As shown in FIG. 2 jacket 80 wraps snugly around the forward edge of housing 90 and abuts flange-like element 210. Spaced teeth 105 protruding inwardly from clamp 100 are fitted around and engaged a stepped surface 80A provided on jacket 80 thereby preventing any left to right movement (as viewed in FIG. 2) of housing 90 or medium 140 which may occur as a result of the left to right pushing force exerted on medium 140 via pushing elements 30, 50, 60. As shown in FIG. 2, stepped surface 80A includes a stepped face which may engage teeth 105 if and as housing 90 undergoes any left to right movement under the force of pusher 30, 50, 60 acting on medium 140.

As described hereinabove, spaces are provided between fingers 75 in order that the cooling air which eventually flows past or through flange-like element 200 may continue to flow over strap 70, through the spaces between fingers 75, over jacket 80, and out of the system entirely through the spaces between teeth 105. A continuous annular air cooling passage is thus provided within housing 20 which extends from the rear or left most end of housing 20, FIG. 2, and entirely therethrough to clamp 100.

With reference to the assembly of the rear face 30, springs 50, and spaced arms 60, the distance between the rear face 30 and the pushing ends 65 of arms 60 is selected (via selection of an appropriate length for the springs 50 or the arms 60), such that the springs 50 are compressed (upon mating of clamp 100 and yoke 120) so as to exert a compression force of less than about 150 and, most preferably, about 40 pounds per square inch between light transmissive media 140 and 150 at mating surface 170, FIG. 2.

The light transmissive media 140, 150, FIG. 2, typically comprise bundles of optical-grade fibers, the ends of which are polished such that they may be readily mated with each other (e.g., at mating area 170) to simulate a single continuous light transmissive medium.

Inasmuch as stray magnetic and/or electric fields may interfere with any light image(s) which are transmitted through media 140, 150, the individual components of the coupler including face 30, arms 60, and strap/finger assembly 70, 75 are typically comprised of one or more non-conductive, non-magnetically interactive materials such as plastic, rubber, fiberglass and the like. Similarly springs 50 are most preferably comprised of a non-magnetically interactive metal such as beryllium, copper, aluminium, and alloys of one or more of all the foregoing and the like. Inasmuch as clamp 100 and housing 90 typically comprise conductive metal materials, jacket 80 is preferably comprised of an electrical insulating material thereby insulating housing 90 and, a fortiori medium 140, 150, from stray electrical contact.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A joint for coupling light transmissive media mounted in separate housings, at complementary mating surfaces comprising:
   a pusher including variably compressible spring means attached to an array of spaced pusher arms engageable with a pusher surface connected to one of the light transmissive media, wherein the pusher and the one light transmissive medium are successively mounted within one of the separate housings through which a flow of air is routed through the pusher and over the one light transmissive medium;
   a barrier for engaging the rear of the pusher wherein the distance between the rear of the pusher and the point of engagement of the arms with the pusher surface is selected to exert a predetermined amount of compression force in the springs upon mating of the complementary mating surfaces and coupling of the housings; and,
   means for aligning the mating surfaces, comprising a pilot strap surrounding one of the light transmissive media, the pilot strap including spaced fingers for receiving and aligning the mating surface of the other of the light transmissive media with the mating surface of the one medium, the fingers protruding laterally from and parallel to the axis of the strap.

2. The joint of claim 1 wherein the pusher and the means for aligning comprise one or more non-conductive, non-magnetically interactive materials.

3. The joint of claim 2 further comprising a means for coupling the separate housings.

4. The joint of claim 3 wherein the means for coupling comprises a yoke extending around one of the housings, an insulating jacket extending around the other of the housings, and a clamp extending around and engageable with the jacket through spaced detents extending inwardly from the clamp, the clamp and the yoke including means for attaching to each other.

5. The joint of claim 4 wherein the jacket comprises one or more non-conductive, non-magnetically interactive materials.

6. The joint of claim 5 wherein the spaces between the spaced pusher arms, the spaced fingers and the spaced detents are aligned upon coupling of the clamp and the yoke so as to allow air to flow without interruption through the pusher, past the means for aligning, and through the clamp.

7. The joint of claim 6 wherein the spring means comprise one or more metals selected from the group consisting of copper beryllium and aluminium.

8. The joint of claim 3 wherein a thin layer of light transmissive oil resides between the complementary mating surfaces of the light transmissive media when coupled.

9. The joint of claim 8 wherein the mating surfaces comprise polished optical fiber surfaces and the predetermined amount of force exerted between the mating surfaces via compression of the springs upon coupling of the housings is selected to be about forty pounds per square inch.

10. A joint for coupling light transmissive media mounted in separate conductive housings at complementary mating surfaces comprising:
    means for coupling the housing in non-conductive relationship;
    a pusher including variably compressible spring means attached to an array of spaced pusher arms engageable with a pusher surface connected to one of the light transmissive media, wherein the pusher and the one light transmissive medium are successively mounted within one of the separate housings through which a flow of air is routed through the pusher and over the one light transmissive medium;
    a barrier for engaging the rear of the pusher wherein the distance between the rear of the pusher and the point of engagement of the pusher arms with the pusher surface is selected to exert a predetermined amount of compression force between the complementary mating surfaces upon mating of the surfaces and coupling of the housings; and,
    means for aligning the mating surfaces, comprising a pilot strap surrounding one of the light transmissive media, the pilot strap including fingers for receiving and aligning the mating surface of the one medium, the fingers being spaced around the perimeter of the strap, protruding laterally therefrom and parallel to the axis of the strap;
    wherein the pusher and the means for aligning comprise one or more non-conductive, non-magnetically interactive materials, and the spaces between the arms and the fingers are aligned with one another to allow air to flow through the pusher and the means for aligning without interruption.

11. The joint of claim 10 wherein the means for coupling comprises a yoke extending around one of the housings, an insulating jacket extending around the other of the housings, and a clamp extending around and engageable with the jacket through spaced detents projecting inwardly from the clamp, the clamp and the yoke including means for coupling to each other.

* * * * *